United States Patent [19]
Perisho

[11] Patent Number: 5,533,420
[45] Date of Patent: Jul. 9, 1996

[54] PARKING BRAKE SYSTEM INCLUDING AN INTERNAL CLUTCH SPRING

[75] Inventor: Randal J. Perisho, Moberly, Mo.

[73] Assignee: Dura Automotive Holding, Inc., Troy, Mich.

[21] Appl. No.: 246,628

[22] Filed: May 20, 1994

[51] Int. Cl.$^6$ .................................................. G05G 1/14
[52] U.S. Cl. ........................ 74/512; 74/513; 74/516; 74/501.5 R; 74/535
[58] Field of Search ......................... 74/512, 513, 560, 74/531, 575; 188/290, 291, 77 W, 271; 192/12 BA, 57

[56] References Cited

U.S. PATENT DOCUMENTS

| | | | |
|---|---|---|---|
| 1,965,878 | 7/1934 | Briggs | 192/8 C |
| 3,943,907 | 3/1976 | Kluth | 74/513 X |
| 4,651,854 | 3/1987 | Harada | 192/8 C |
| 4,841,798 | 6/1989 | Porter et al. | 74/512 |
| 4,850,242 | 7/1989 | Hass et al. | 74/512 |
| 5,011,237 | 4/1991 | Matouka et al. | 303/115 |
| 5,182,963 | 2/1993 | Perisho et al. | 74/512 |
| 5,261,732 | 11/1993 | Matouka | 192/8 C |
| 5,275,262 | 1/1994 | Ojima et al. | 188/82.6 |
| 5,309,786 | 5/1994 | Pare et al. | 74/512 |
| 5,335,563 | 8/1994 | Yamamoto et al. | 74/531 X |
| 5,385,068 | 1/1995 | White et al. | 74/560 X |
| 5,408,899 | 4/1995 | Stewart | 74/513 |

FOREIGN PATENT DOCUMENTS

| | | | |
|---|---|---|---|
| 4-321460 | 11/1992 | Japan | 74/512 |
| 5-131905 | 5/1993 | Japan | 74/512 |
| 5-238364 | 9/1993 | Japan | 74/512 |

*Primary Examiner*—Vinh T. Luong
*Attorney, Agent, or Firm*—Laubscher & Laubscher

[57] ABSTRACT

A parking brake mechanism for operating a parking brake cable includes an operating lever pivotally connected with a mounting bracket for movement between brake-applied and brake-released positions, a locking device for releasably locking the lever in the brake-applied position, and a self-adjust device for automatically removing slack from the parking brake cable when the lever is in the brake-released position, characterized in that at least one of the locking and self-adjust devices includes a spring clutch having an internal clutch spring member.

9 Claims, 5 Drawing Sheets

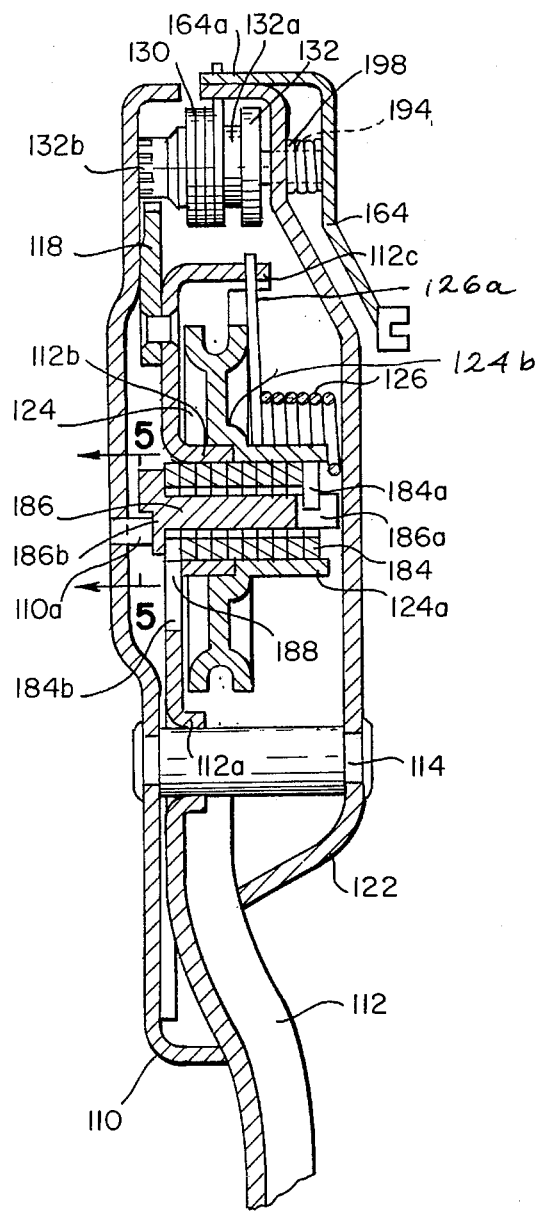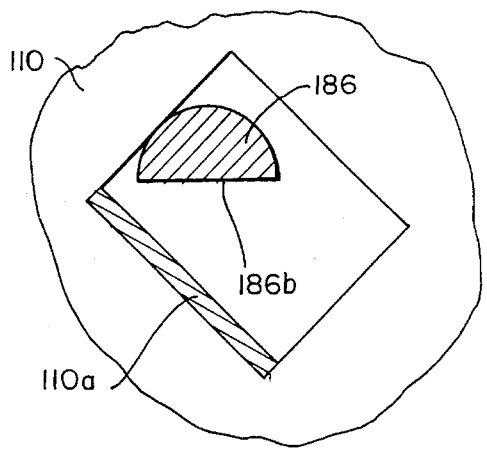
FIG. 5
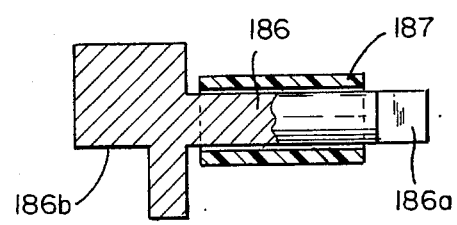
FIG. 6
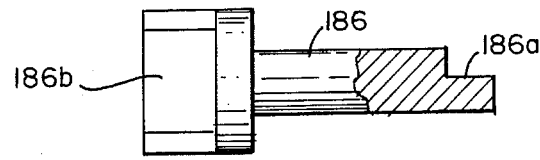
FIG. 7
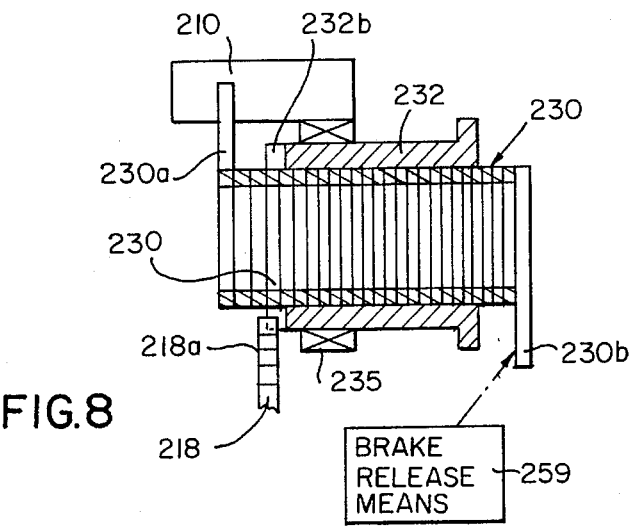
FIG. 4
FIG. 8

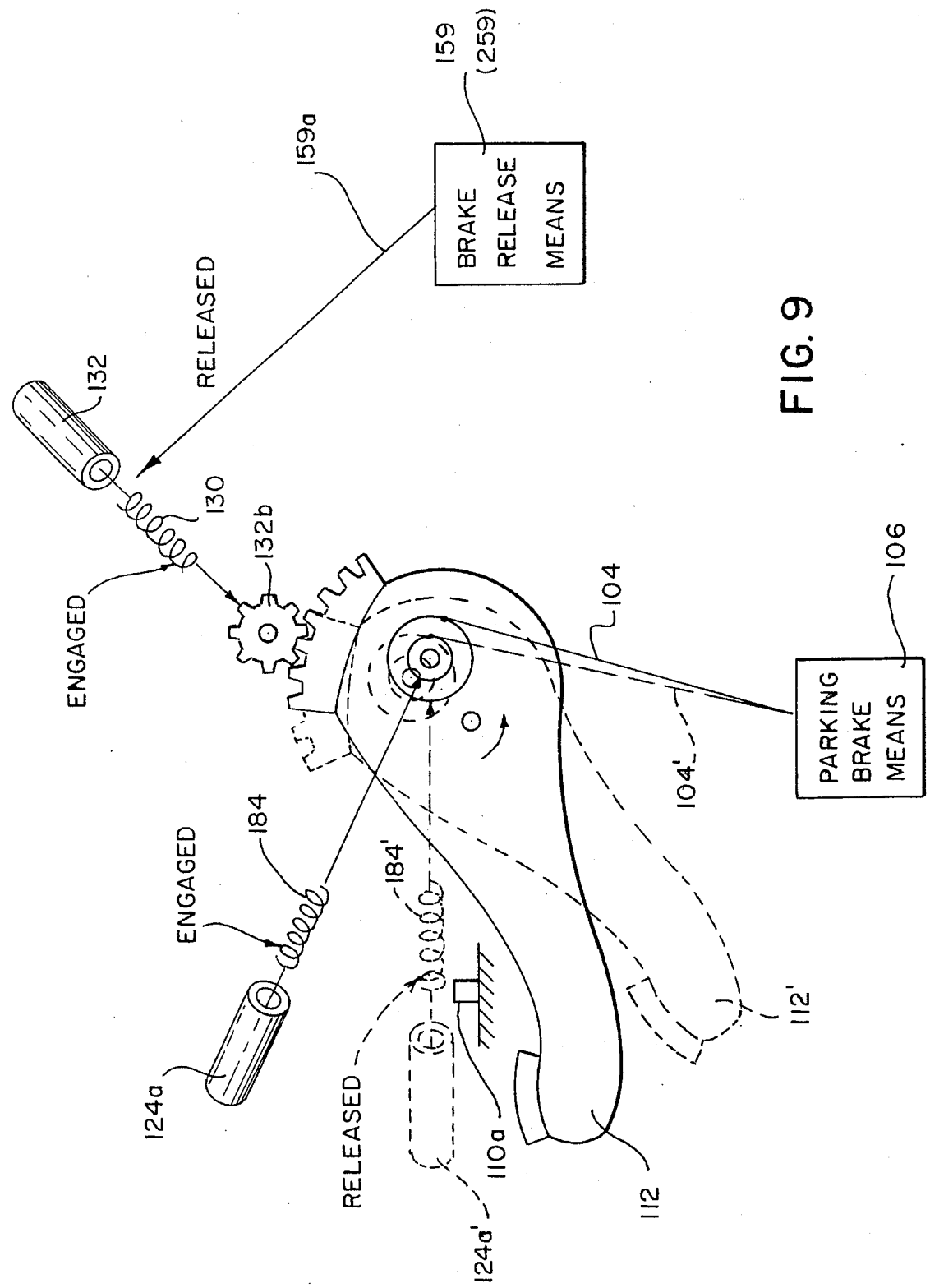

PARKING BRAKE SYSTEM INCLUDING AN INTERNAL CLUTCH SPRING

BACKGROUND OF THE INVENTION

1. Field of the Invention

A parking brake arrangement includes an operating lever pivotally movable between brake-applied and brake-released positions, with locking means for releasably locking the lever in the brake-applied position, and self-adjust cable slack removing means for automatically removing cable slack when the lever is in the brake-released position, at least one of the locking and cable slack removing means including internal spring clutch means.

2. Brief Description of the Prior Art

It is well known in the vehicle parking brake art to provide self-adjust means for removing cable slack when the operating lever is in the brake-released position, as evidenced by the U.S. Pat. Nos. to Porter et al 4,841,798 and Hass et al 4,850,242, each assigned to the same assignee as the present invention. In the Hass et al patent, it is proposed to obtain "soft" release operation of the parking brake lever by the use of spring clutch means of the external clutch spring and drum type. In the Porter et al patent, as illustrated in FIGS. 1 and 2, when the parking brake mechanism is in the fully released condition, the adjuster/track sub-assembly 26, 24 is allowed to freely rotate in a direction so as to cause greater cable tension until a point of equilibrium is reached, thereby insuring a minimum tension and lack of cable slack at each stroke. The lock pawl 30 is held out by the lock pawl release lever 64 which is rotated to the "release position" by the pedal owing to the engagement between lever 12 and button 66. The drive pawl 32 is held out of engagement with ratchet teeth 18b by a fixed tab 10e on the mounting bracket 10, thereby allowing free rotation of the self-adjuster in either the clockwise or the counter clockwise direction. The ends 26a and 26b of the preloaded spring 26 react between the drive stud 27 and with the ratchet pivot sleeve 20, thereby to rotate the ratchet 18 and the cable tract 24 in the cable-tensioning direction relative to lever 12. Thus, the advantage is presented of "over adjust" safeguard, owing to the lock pawl 20 and drive pawl 32 being maintained in the disengaged condition.

When the operator applies a brake-engaging force to the pedal 12, rotation direction about the main pivot axis 14 is initiated. Owing to the drive pawl 32 being fixed between the pedal 12 and the drive plate 16, it begins to rotate away from the fixed tab 10e, thereby allowing the drive pawl 32 to engage in the ratchet teeth 18a to initiate cable take up. At this point, the ratchet 18 is connected with the pedal 12, and both legs of the adjuster spring 26a and 26b are locked so as to retain spring position during the "apply" and "lock" cycle. After a specified amount of stroke otherwise known as "free travel", the lock pawl release lever 64 is rotated to an off position by the release lever spring 60 which in turn allows the lock pawl 30 to engage in the ratchet 18, thereby allowing the cable load to be held by the connection between ratchet 18 and the mounting bracket means 10. As the operator continues the brake-applying force, at a point designed to be the end of the "free travel", the pedal pawl 52 engages pedal ratchet notches 12e integral with the lever 12. At any time after the pedal pawl (52) begins to ratchet, the operator's foot may be removed and the mechanism will maintain the resultant cable load. At the time that the operator's foot is removed, the pedal pawl 52 is driven to the end of an internal slot 52a and at the same time the pedal 12 "back drives" to an intermediate position. The drive pawl 32 is relieved, and at this time the adjuster spring end 26a is allowed to relax, insuring that the lock pawl 30 is fully engaged in a notch of the ratchet 18, thereby holding the cable load.

After the parking brake system has been set, upon actuation of the manual release lever 58 (either manually by the manual release control means 59, or automatically by the vacuum means 72 upon the starting of the vehicle), the manual release lever 58 pivots about its pivot shaft 50 to cause the pedal pawl 52 to rotate to a released position, thereby disengaging the pedal teeth 12e to allow the pedal 12 to rotate in the clockwise direction, owing to the force created by the adjuster spring end 26a transmitted through the drive stud 27.

As evidenced by the Perisho et al U.S. Pat. No. 5,182,963 (also assigned to the same assignee as the present invention), it has been proposed to provide in the parking brake mechanism art clutch spring mechanisms including drums that are formed of porous or sintered metal impregnated with a damping oil, thereby to achieve improved long-lasting soft-release operation of the parking brake operating lever.

Other spring clutch arrangements are disclosed in the U.S. Pat. No. to Briggs No. 1,965,878, Havada No. 4,651,854, Matoukak et al No. 5,011,237 and Ojima et al No. 5,275,262.

In the prior systems, use has been made of spring clutches of the external type—i.e., the clutch spring is generally arranged concentrically about a companion drum member for frictional engagement with the external surface thereof. In the case of a self-adjust cable slack adjuster system, the clutch spring and the cable track biasing spring require a substantial amount of space, thereby increasing the size and cost of the parking brake mechanism. The present invention was developed to incorporate spring clutches of the internal type, thereby to provide space for a larger torsion spring for rotatably biasing the cable track member in the slack-removing direction. A further advantage is that the anchoring of the internal clutch spring is not as critical as in an external clutch spring, and the turns of the spring permit an allowable stress that is higher in compression than in tension. The spring clutch affords infinite position adjustment with finite travel, and the "skipout" which occurs with conventional ratchet and pawl locking mechanisms is avoided.

SUMMARY OF THE INVENTION

Accordingly, a primary object of the present invention is to provide an improved parking brake mechanism including a foot-or hand-operated operating lever pivotally connected with a mounting bracket for displacement between brake-applied and brake-released positions, locking means for releasably locking the lever in the brake-applied position, and self-adjust cable track means for removing cable slack when the operating lever is in the brake-released position, at least one of said locking and cable-slack-removing means including an internal spring clutch.

According to a more specific object of the invention, the internal clutch spring is incorporated in the self-adjust cable slack removing means for releasably connecting the cable track member with the operating lever. The internal clutch spring is connected at one end with the operating lever and extends longitudinally within a tubular drum portion integral with the cable track member. A rotatably mounted adjust rod extends longitudinally within the internal clutch spring for contracting the turns thereof when the operating lever is in the brake-released position, thereby to disconnect the cable track member from the operating lever. The adjust rod is rotated about its longitudinal axis owing to the engagement between a flat lateral operating surface thereon and a corresponding stationary adjust tab formed on the mounting bracket of the parking brake mechanism.

A further object of the invention is to incorporate an internal spring clutch within the locking means that retain the operating lever in the brake-applied position. In the preferred embodiment, the locking means includes a gear member that is rotatably supported by the mounting bracket and includes a toothed tubular gear drum portion that is in enmeshing engagement with a sector gear fastened to the operating lever, the internal clutch spring extending within said gear drum portion for frictional locking engagement with the inner peripheral surface thereof.

According to a more specific object of the invention, the drum portions of the self-adjust slack removal means and/or the lever locking means are formed of a porous metal, such as a nickel-iron powder impregnated with a suitable damping oil, such as a polyalphaolefin. The clutch spring is formed of spring steel, such as MB grade steel SAE 1064, and the helical turns of the clutch spring have a square or rectangular cross-sectional configuration.

BRIEF DESCRIPTION OF THE DRAWINGS

Other objects and advantages of the invention will become apparent from a study of the following specification, when viewed in the light of the accompanying drawings, in which:

FIGS. 3 and 4 are exploded and sectional views, respectively, of the improved parking brake system of the present invention;

FIG. 5 is a sectional view taken along line 5—5 of FIG. 4;

FIGS. 6 and 7 are side elevation and bottom plan views of the adjust rod of FIG. 4;

FIG. 8 is a sectional view of a preferred embodiment of the internal spring clutch brake lever locking; and FIG. 9 is a diagrammatic view illustrating the operation of the apparatus of FIG. 4.

DETAILED DESCRIPTION

Figure 1:
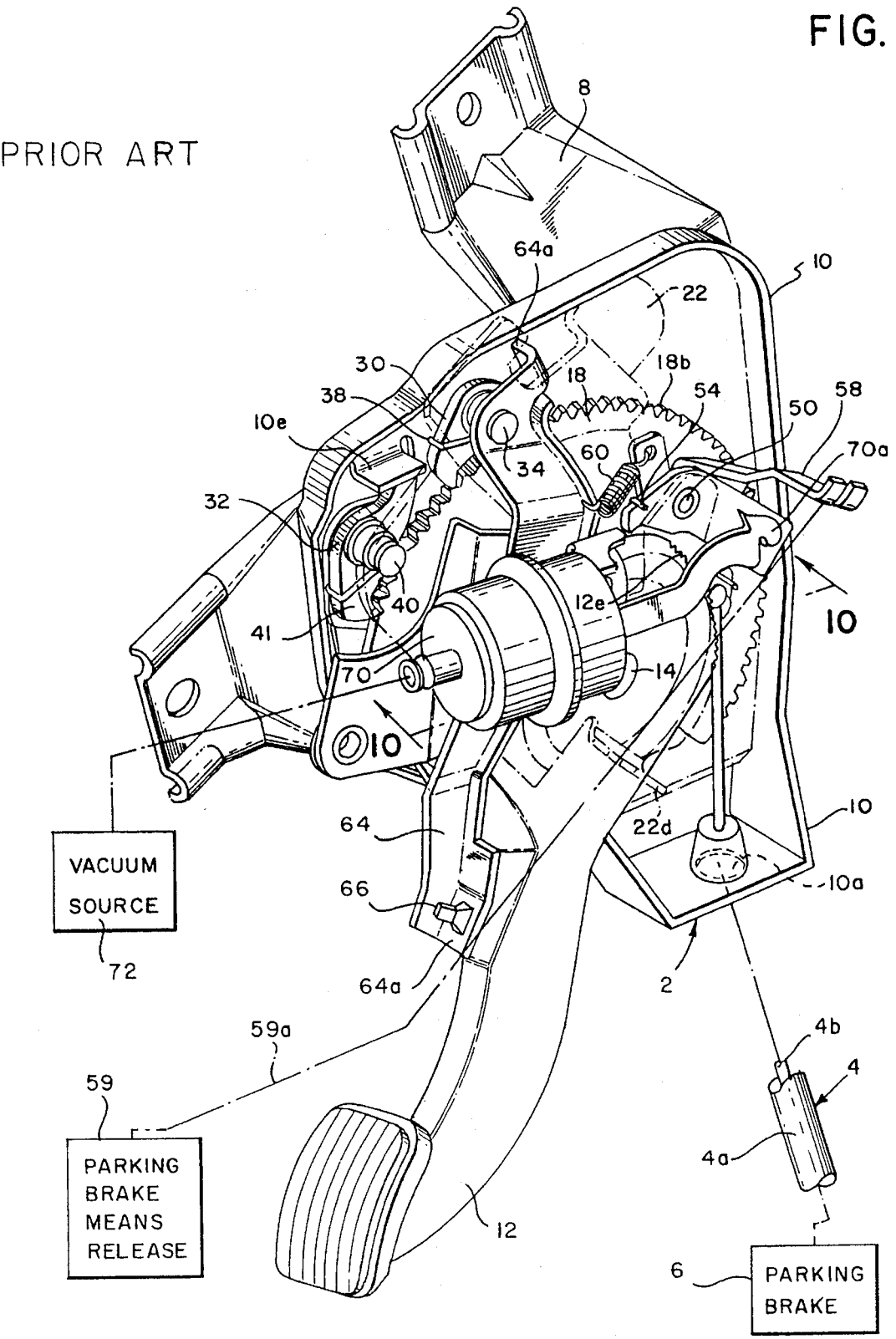
FIGS. 1 and 2 are perspective and exploded views, respectively, of the prior art parking brake system of the Porter et al U.S. Pat. No. 4,841,798.
Figure 2:
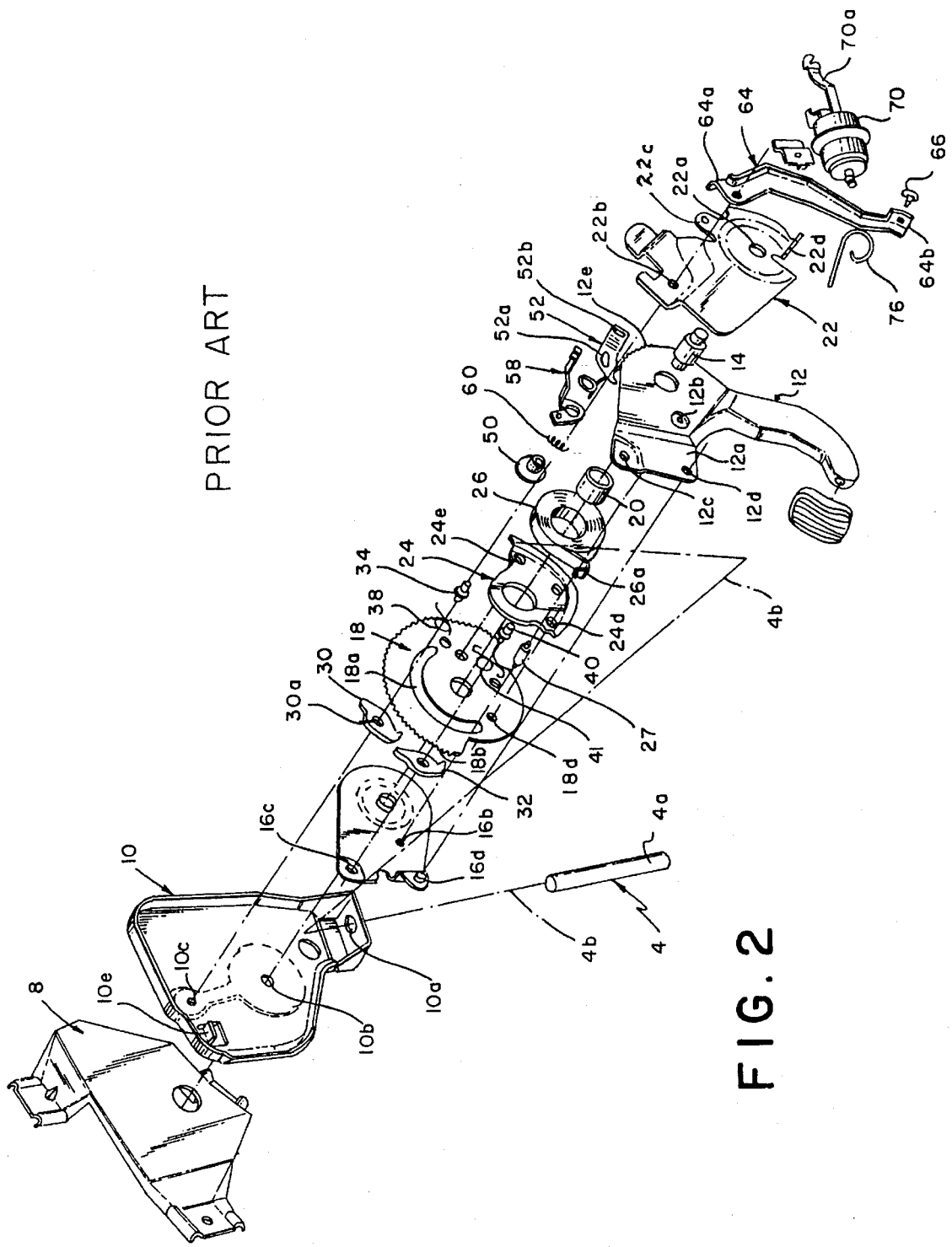
Figure 3:
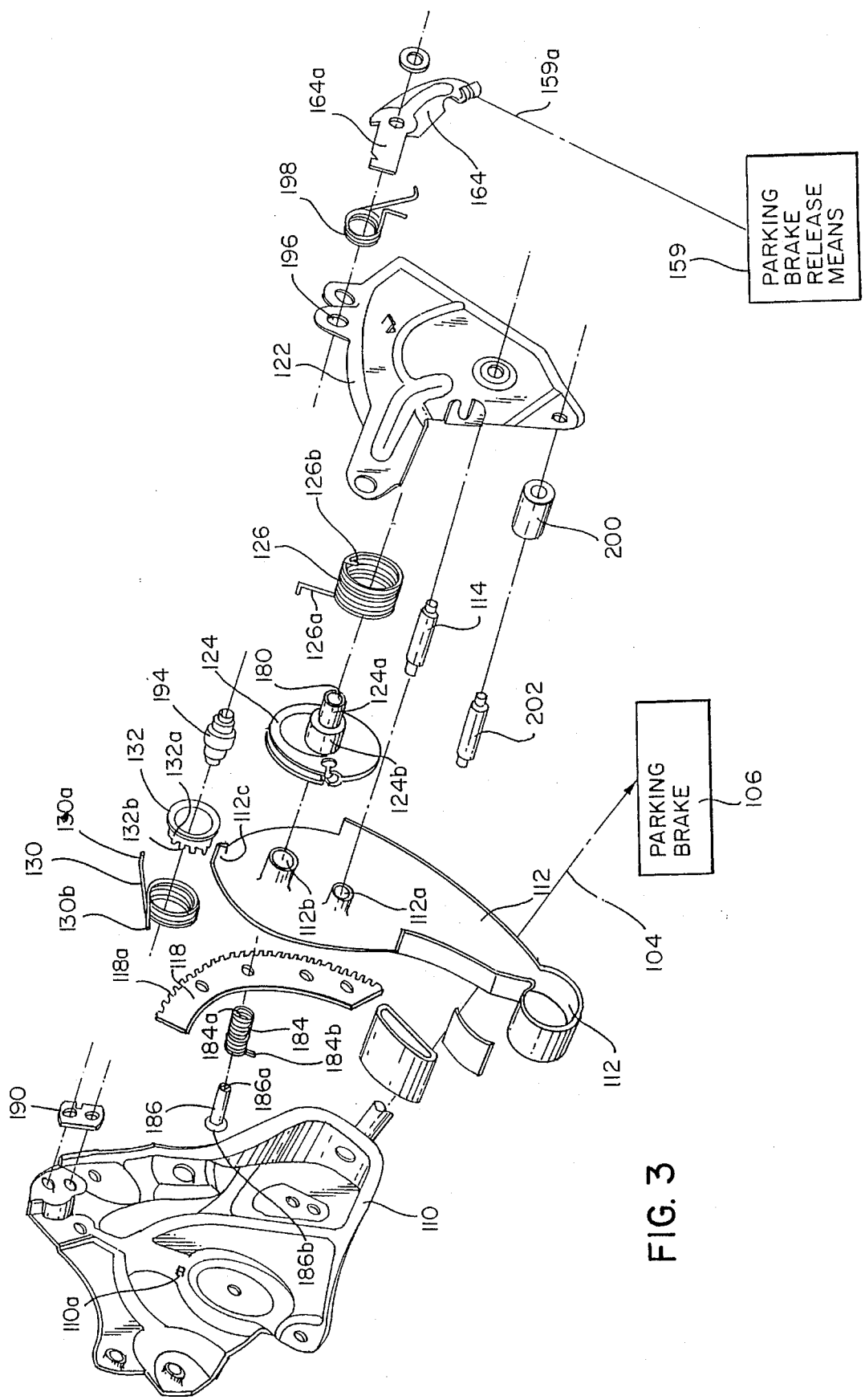

Referring now to the improved parking brake system of the present invention illustrated in FIGS. 3 and 4, the parking brake lever 112 is pivotally connected with mounting bracket 110 by pivot pin 114 the ends of which are supported by mounting bracket 110 and cover member 122, respectively. Sector gear 118 is secured to lever 112 for movement therewith. Lever 112 has a first tubular extrusion portion 112a journalled on pivot pin 114, and a second tubular extrusion portion 112b upon which is journalled the cable track tension adjusting member 124. Parking brake cable 104 extends tangentially from the cable track 124 to the parking brake means 106 via an opening contained in mounting bracket 110. Cable slack removing means are provided including a helical torsion spring 126 which normally biases cable track member 124 in the cable-tension-increasing slack-removing counterclockwise direction relative to operating lever 112, which spring includes a radially outwardly directed leg portion 126a that engages tab portion 112c on lever 112, and a radially inwardly directed leg portion 126b that extends through slot 180 contained at the free extremity of the tubular extrusion drum portion 124a of cable track 124. Tubular drum portion 124a is formed to define a second tubular portion 124b of greater internal diameter that is journalled on second lever tubular extrusion portion 112b.

Arranged concentrically within the tubular drum portion 124a of cable track 124 is a helical internal clutch spring 184 the turns of which are normally biased radially outwardly into frictional engagement with the inner circumferential surface of drum portion 124a. At one end, the clutch spring 184 includes a radially inwardly directed first leg portion 184a that engages a longitudinally extending flat surface 186a provided at one end of an adjust rod 186 that extends longitudinally through the clutch spring. At its other end, the clutch spring 184 includes a second radially outwardly directed leg portion 184b that extends within a corresponding radial slot 188 contained in lever 112 adjacent second tubular extension portion 112b, as shown in FIG. 4. The adjust rod 186 includes at its other end a second flat longitudinal surface 186b that is orthogonally arranged relative to the first flat end surface 186a, which second flat surface 186b is adapted to engage tab portion 110a on mounting bracket 110, as will be described below. If desired, the adjust rod may be loosely rotatably supported within the internal clutch spring 184 by a concentrically mounted thin synthetic plastic support sleeve 187 (FIG. 6).

Locking means are provided for releasably locking the brake operating lever in its brake-engaged position. To this end, there is arranged in continuously enmeshing engagement with the teeth 118a of sector gear 118 a locking gear drum 132 having a tubular drum portion 132a that carries at its free extremity a plurality of circumferentially arranged gear teeth 132b. External helical clutch spring 130 is arranged concentrically about the drum portion 132b, which spring has helical turns that are normally biased radially inwardly into frictional engagement with the peripheral surface of drum portion 132b. At one end, the clutch spring includes a tangentially outwardly directed first leg portion 130a that is fastened to mounting bracket 110 by anchor plate 190, and a second leg portion 130b that extends outwardly in the opposite direction from first leg 130a. As will be described in greater detail below, this second leg portion serves as a release leg that is operable by the orthogonal tab portion 164a of release lever 164 which is mounted for pivotal movement about pivot pin 194, said pin being supported at one end by bracket 110 and extending outwardly through a corresponding opening 196 contained in cover 122. Coiled tension spring 198 mounted concentrically about pivot pin 194 reacts between cover 122 and release lever 164 to bias the lever in the counterclockwise direction (in FIG. 3) away from the release leg portion 130b of clutch spring 130.

Finally, resilient tubular bumper stop member 200 is mounted concentrically about support pin 202 that is supported by its ends between mounting bracket 110 and cover member 122.

OPERATION (FIGS. 3 AND 4)

In operation, assume that the parking brake foot lever 112 is initially in the brake-released position. To apply the parking brake, lever 112 is depressed downwardly in the counterclockwise direction, and owing to the direction of the turns of internal clutch spring 184 and the resulting frictional engagement between the turns and the inner peripheral surface of the drum portion 124a of cable track 124, the cable track 124 is rotated in the counterclockwise direction to apply tension to parking brake cable 104, thereby to progressively apply the parking brake 106. During this downward pivotal movement of lever 112 toward the brake-fully-applied position, gear drum 132 is rotated in the clockwise direction owing to the engagement between the sector teeth 118a and gear drum teeth 132b, thereby overcoming the frictional resistance between external clutch spring 130 and the outer periphery of gear drum portion 132a. Owing to the direction of the turns of external clutch spring 130, gear drum 132a is locked to the mounting bracket to prevent brake pedal lever 112 from pivoting in the opposite (clockwise) direction toward the initial brake-released position.

To release the parking brake 106, the manually or mechanically operable brake release means 159 is operated to apply tension to release cable 159a, thereby to pivot release lever 164 in the clockwise direction against the biasing force of spring 198, whereupon tab 164a engages leg 130b of the external clutch spring 130 to expand the turns of clutch spring 130 relative to the outer periphery of drum portion 132a, whereby drum 132a, sector gear 118a and lever 112 are released so that the tension in the parking brake cable 104 pivots lever 112 in the clockwise direction into engagement with the resilient bumper stop 200.

When foot pedal lever 112 returns to its brake-released position, stationary adjust tab 110a on the mounting bracket 110 engages the flat surface 186b on adjust rod 186, thereby to rotate adjust rod 186 about its longitudinal axis so that flat surface 186a on rod 186 engages the adjacent inwardly directed leg 184a of clutch spring 184. The turns of clutch spring are now contracted inwardly toward a disengaged condition relative to the inner periphery of drum portion 124a, and owing to the biasing force of coil spring 126, cable track members 124 is rotated in the counterclockwise direction relative to mounting bracket 110, thereby to remove slack from parking brake cable 104.

Upon the reapplication of the parking brake by downward pivotal movement of foot pedal lever 112, clutch spring leg 184b is displaced from tab 110a, and the helical turns of internal clutch spring 184 expand to again connect lever 112 with cable drum track 124. The application of the parking brake continues in the manner described above.

It is important to note that each of the turns of internal clutch spring 184 has a rectangular cross-sectional configuration as shown in FIG. 4, the small dimension extending axially of the spring. Thus, when the spring 184 and/or the inner surface of the drum portion 124a are impregnated with damping oil (as taught by the Perisho et al U.S. Pat. No. 5,182,963), the cooperating frictional surfaces are protected against contamination, and an internal clutch spring of smaller than normal size may be used for essentially holding a static load. The internal clutch spring allows for a large low rate adjust spring-on mechanism. Finally, the improved parking brake system using the internal clutch spring requires fewer parts and is less costly to manufacture and assemble than the prior art mechanisms.

Referring now to the preferred embodiment of FIG. 8, the spring clutch means for locking the brake operating lever in the brake-applied condition includes an internal clutch spring 230 the helical turns of which are normally biased outwardly into engagement with the inner circumferential surface of the drum portion 232a of the locking gear drum 232. Preferably, the gear drum portion is formed of a porous powdered metal composition impregnated with damping oil, and owing to the concealed arrangement of the internal clutch spring within the tubular gear drum, the cooperating frictional surfaces are protected against impurities and contamination, and afford the desired soft release capability. The drum portion 232a of gear 232 is journalled in fixed bearings 235 carried by mounting bracket 210, which drum portion is provided at its left-hand end with circumferentially arranged gear teeth 232b that engage sector gear teeth 218a of sector gear 218.

While the preferred forms and embodiments have been illustrated and described as required by the Patent Statutes, various changes may be made without deviating from the inventive concepts set forth above.

What is claimed is:

1. Parking brake apparatus adapted for connection with a vehicle having a parking brake operated by a cable, comprising:

(a) a mounting bracket (110) adapted for connection with the vehicle;

(b) an operating lever (112) pivotally connected with said mounting bracket for movement between brake-applied and brake-released positions relative to said mounting bracket;

(c) locking means (118, 130, 132) for releasably locking said lever in the brake-applied position; and (d) connecting means connecting the parking brake cable with said lever, said connecting means including:

(1) an annular cable track member (124) adapted for connection with the parking brake cable;

(2) means connecting said cable track member for rotation about an axis parallel with the pivotal axis of said lever, said cable track member having a tubular hub portion (124a) that is colinearly arranged relative to said axis of rotation;

(3) cable-slack-removing spring means (124) normally biasing said cable track member in a cable-tensioning direction relative to said lever, thereby to take up slack in the cable;

(4) internal spring clutch means normally connecting said cable track member with said lever, said spring clutch means including a helical clutch spring (184) extending concentrically within said tubular cable track hub portion, said clutch spring having at one end a plurality of helical turns that are normally biased radially outwardly into frictional engagement with the inner peripheral surface of said cable track hub portion, said clutch spring being connected at its other end with said lever; and (5) means (110a, 186) operable when said lever is in the brake-disengaged position for contracting said clutch spring turns radially inwardly to disengage said turns from said cable track hub portion, thereby to release said cable track member for rotation by said cable-slack-removing spring means in the cable slack removing direction.

2. Apparatus as defined in claim 1, wherein at least the inner surface of said cable track hub portion is formed of porous metal impregnated with a damping oil.

3. Apparatus as defined in claim 2, wherein each of said helical clutch spring turns has a rectangular cross-sectional configuration the smaller dimension of which extends axially of the spring.

4. Apparatus as defined in claim 2, wherein said helical clutch spring turns have a square cross-sectional configuration.

5. Parking brake apparatus adapted for connection with a vehicle having a parking brake operated by a cable, comprising:

(a) a mounting bracket (110) adapted for connection with the vehicle;

(b) an operating lever (112) pivotally connected with said mounting bracket for movement between brake-applied and brake-released positions relative to said mounting bracket;

(c) locking means (118, 130, 132) for releasably locking said lever in the brake-applied position; and (d) connecting means connecting the parking brake cable with said lever, said connecting means including:

(1) an annular cable track member (124) adapted for connection with the parking brake cable;

(2) means connecting said cable track member for rotation about an axis parallel with the pivotal axis of said lever, said connecting means including a lever tubular hub portion (112b) carried by said lever and upon which said cable track member is journalled, said cable track member having a cable track hub portion (124a) that is colinearly arranged relative to said lever hub portion;

(3) cable-slack-removing spring means (124) normally biasing said cable track member in a cable-tensioning direction relative to said lever, thereby to take up slack in the cable;

(4) internal clutch spring means normally connecting said cable track member with said lever, said spring clutch means including a helical clutch spring (184) extending concentrically within said lever and said cable track tubular hub portions, said clutch spring having at opposite ends a plurality of helical turns that are normally biased radially outwardly into frictional engagement with the inner peripheral surfaces of said lever and said cable track hub portions, respectively; and (5) disengaging means (110a, 186) operable when said lever is in the brake-disengaged position for contracting said clutch spring turns and one end of said helical spring radially inwardly to disengage said clutch spring turns from said cable track hub portion, said disengaging means including:

(a) a rotatable adjust rod (186) extending axially longitudinally within said clutch spring, said clutch spring one end having a radially inwardly extending first leg portion (184a), said adjust rod including a first lateral flat portion (186a) adjacent said first spring leg portion; and (b) means (110a) carried by said mounting bracket for rotating said adjust rod about its longitudinal axis when said lever approaches said brake-released position relative to said monitoring bracket, thereby to contract the turns of said clutch spring to release said cable track member relative to said lever.

6. Apparatus as defined in claim 5, wherein said locking means comprises:

(1) a cylindrical locking gear (132) rotatably connected with said mounting bracket for rotation about an axis parallel with the lever pivot axis, said locking gear including at one end a drum portion (132a) carrying at its free end a plurality of locking gear teeth (132b);

(2) a sector gear (118) connected with said lever, said sector gear having gear teeth in continuous engagement with said locking gear teeth;

(3) a further helical clutch spring (130, 230) arranged concentrically relative to said locking gear drum portion, said further clutch spring having at one end a plurality of helical turns that are normally in frictional engagement with the associated surface of said locking gear drum portion, said further helical clutch spring being connected at its other end with said mounting bracket; and (4) release means (164, 259) for operating said further clutch spring turns to radially deform and disengage the same from said locking gear drum portion.

7. Apparatus as defined in claim 5, wherein said means for rotating said adjust rod comprises a stationary adjust tab (110a) carried by said mounting bracket, said adjust rod including a second lateral flat portion (186b) arranged for engagement with said adjust tab when said operating lever is in the brake-released position.

8. Apparatus as defined in claim 7, and further including means (187) for rotatably supporting said adjust rod within said internal clutch spring.

9. Apparatus as defined in claim 7, wherein said cable-slack-removing spring means includes a torsion spring (126) mounted concentrically about said cable track hub portion, and means connecting the ends of said torsion spring with said lever and with said cable track member, respectively, said torsion spring being operable to bias said cable track member for rotation in the cable slack removing direction.

* * * * *